United States Patent
Matsui

(10) Patent No.: US 7,247,188 B2
(45) Date of Patent: Jul. 24, 2007

(54) PARTICLE PRODUCING METHOD AND PARTICLE PRODUCING APPARATUS

(75) Inventor: Isao Matsui, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 356 days.

(21) Appl. No.: 10/695,788

(22) Filed: Oct. 30, 2003

(65) Prior Publication Data
US 2004/0159186 A1    Aug. 19, 2004

(30) Foreign Application Priority Data
Feb. 17, 2003    (JP)    ............................ P2003-037587

(51) Int. Cl.
B22F 9/26    (2006.01)
C01B 31/18    (2006.01)

(52) U.S. Cl. ........................ 75/362; 423/247

(58) Field of Classification Search .................. 75/362
See application file for complete search history.

(56) References Cited

U.S. PATENT DOCUMENTS 4,948,422 A * 8/1990 Yoshizawa et al. ........... 75/348
5,792,340 A * 8/1998 Freel et al. .................. 208/127
6,482,374 B1 * 11/2002 Kumar et al. ............. 423/179.5
2003/0099590 A1 * 5/2003 Miura et al. ................. 423/412

FOREIGN PATENT DOCUMENTS

JP    03-013511 A * 1/1991
JP    2001-261335    9/2001

* cited by examiner

Primary Examiner—George P. Wyszomierski
(74) Attorney, Agent, or Firm—Finnegan, Henderson, Farabow, Garrett & Dunner, L.L.P.

(57) ABSTRACT

A particle producing apparatus includes a reaction container, an introduction portion for introducing a source gas and a reaction inhibitor generating gas into the reaction container, an inert gas introduction portion for introducing a carrier gas into the reaction container, a heater provided on the reaction container, and an exhaust portion. The growth of particles is controlled using a particle producing reaction and a reverse reaction.

15 Claims, 1 Drawing Sheet

PARTICLE PRODUCING METHOD AND PARTICLE PRODUCING APPARATUS

This application is based upon and claims the benefit of priority from the prior Japanese Patent Application No. 2003-37587 filed on Feb. 17, 2002; the entire contents of which are incorporated herein by reference.

BACKGROUND OF THE INVENTION

1. Field of the Invention

The present invention relates to a particle producing method and a particle producing apparatus, and more particularly to a particle producing method and a particle producing apparatus for preparing particles in a gas phase using the gas phase reaction.

2. Description of the Related Art

A particle of nanometer size has a large specific surface area (surface area per unit volume) and has a function such as the quantum size effect, which is not provided conventionally. The particle of nanometer size is drawing attention as a substance of new conformation in recent years. The particles of nanometer size are applied to a catalyst, a battery electrode, a visible LED element and a phosphor of display, depending on the kind of particles.

A method for producing particles and a method for controlling the particle size have been described in JP-A-2001-261335.

JP-A-2001-261335 discloses a configuration in which a reaction container has a source gas introduction portion and a surface-adhesion introduction portion separately. Particles are grown while a source gas and a carrier gas are flowed through the reaction container, and produced particles are collected from the opposite side to the source gas introduction portion.

The particles are grown while moving along with the carrier gas within the reaction container.

As a method for producing the particles of desired size, the collected particles may be sieved through a filter. Alternatively, a surface adhesion maybe blown onto the particle surface to compulsorily stop the growth. For this purpose, the surface-adhesion introduction portion is provided on a side of the reaction container.

In the conventional particle producing apparatus with the above configuration, the particle size was controlled depending on timing when the surface adhesion was introduced during growth of particles. Therefore, to obtain particles of a predetermined size, it was necessary to provide the surface-adhesion introduction portion, which was different from the source gas introduction portion (a source gas introduction port).

Moreover, to produce particles of different sizes, it was required to move the surface-adhesion introduction portion (a surface-adhesion introduction port). Alternatively, it was required to provide a plurality of surface-adhesion introduction portions.

Also, even if the surface-adhesion introduction port was shifted, gases in the reaction container had different flow rates and thus, it was difficult to obtain only particles of desired size. To control the size of produced particles means to remove particles of undesired size through the filter. This results in a great influence on the production efficiency.

BRIEF SUMMARY OF THE INVENTION

A particle producing method according to embodiments of the invention, includes introducing a carrier gas into a reaction container, heating an inside of the reaction container, and introducing a source gas and a reaction inhibitor generating gas into the reaction container.

Also, another particle producing method according to the embodiments of the invention, includes pyrolyzing a source gas to produce particles, and producing an inhibition component, which inhibits the pyrolyzing, from a reaction inhibitor generating gas with the produced particles used as a catalyst.

A particle producing apparatus according to the embodiments of the invention, includes a reaction container, an introduction portion, a heater, an exhaust portion, a cooler, and a storage portion. The introduction portion is provided at one end of the reaction container. A source gas, a reaction inhibitor generating gas, and a carrier gas are introduced into the reaction container through the introduction portion. The heater is provided on an outer wall of the reaction container. The exhaust portion is configured to exhaust the carrier gas and produced particles from the other end of the reaction container. The cooler is configured to cool the produced particles exhausted from the exhaust portion. The storage portion is configured to store the produced particles from the cooler.

DETAILED DESCRIPTION OF THE INVENTION

Embodiments of the invention will be described below with reference to the accompanying drawings.

Embodiment 1

Figure 1:
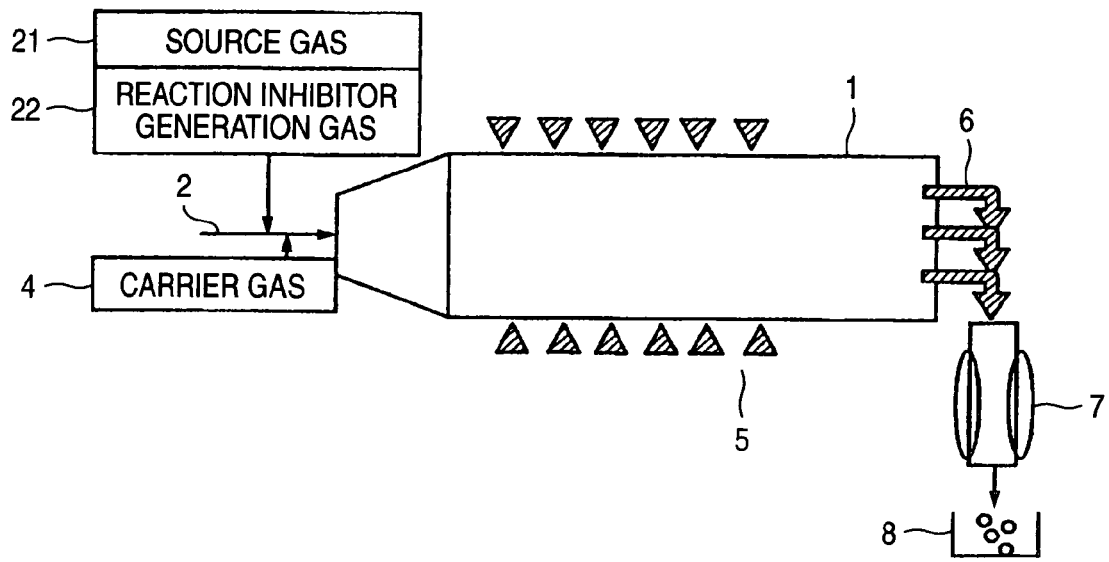
FIG. 1 is a schematic view showing a particle producing apparatus according to an embodiment of the invention.

FIG. 1 is a schematic view showing a first embodiment.

A particle producing apparatus includes a gas introduction portion 2 for introducing gases at one end of a reaction container 1.

Here, the gases introduced into the reaction container 1 include a source gas 21, a reaction inhibitor generating gas 22 and a carrier gas 4. FIG. 1 shows an example in which these gases are mixed and introduced into the reaction container 1. Alternatively, introduction ports for respective gases may be provided at one end of the reaction container separately.

A heater 5, which serves as an excitation device, is provided on an outside wall of the reaction container 1. The heater 5 heats and keeps the inside of the reaction container 1 at temperatures at which a chemical reaction occurs. Preferably, the heater 5 is only provided on an outside wall in the vicinity of a central part of the reaction container 1. The heater 5 is not provided on the upstream side of the central part. This is because if the chemical reaction occurs near an entrance of the reaction container 1, a reaction product sticks near the entrance of the gas introduction portion 2 and might close the entrance thereof. Also, the heater 5 is not provided on the downstream side of the center part. This is because the produced particles are prevented from growing to a size greater than necessary. Of course, the vicinity of the central part does not mean just the center thereof, but is set to be suitable for promoting the reaction.

An exhaust portion 6 is provided at an end of the reaction container 1 opposite to the gas introduction portion 2.

Moreover, the produced particles exhausted and the carrier gas, which are from the exhaust portion 6, are introduced into a cooler 7, and stored in a storage portion 8. The storage portion 8 reserves a solvent such as water, ethanol or methanol in its inside to prevent the stored particles from aggregating. The particles are blown into this solvent.

Though not shown, a heater for removing liquid components and surface adhesion from the solvent containing the particles stored in the storage portion 8 may be added.

The carrier gas 4 is the inert gas such as nitrogen.

Herein, the source gas 21 and the reaction inhibitor generating gas 22 are mixed before being introduced into the reaction container 1. This mixture gas is further mixed with the carrier gas and introduced into the reaction container 1. Alternatively, the carrier gas may be introduced into the reaction container 1 through another introduction port different from the gas introduction portion 2 through which the mixture gas of the source gas 21 and the reaction inhibitor generating gas 22 is introduced.

The source gas is $Fe(CO)_5$.

The reaction inhibitor generating gas includes hydrogen and carbon dioxide.

The particle producing method will be described below.

(1) The carrier gas 4 is introduced into the reaction container 1 to create a stable gas flow from the gas introduction portion 2 to the exhaust portion 6. The air pressure in the reaction container 1 is set to about 101.3 kPa (760 torr).

(2) The heater 5 heats the inside of the reaction container 1 so that the temperature of the reaction container 1 is about 600 to 700° C. In the cooler 7, the temperature is set to approximately room temperature and the air pressure is set to about 101.3 kPa (760 torr).

(3) The mixture gas of the source gas 21 and the reaction inhibitor generating gas 22 is introduced through the gas introduction portion 2 into the reaction container 1. Introducing ports for the source gas 21 and the reaction inhibitor generating gas 22 may be provided separately to introduce the reaction inhibitor generating gas 22 almost at the same time of introducing the source gas 21. Also, an introduction port for the, carrier gas 4 may be provided separately from the introduction port for the mixture gas.

(4) The following heat decomposition reaction (equation 1) occurs within the reaction container 1. This chemical reaction occurs in an area heated at about 600 to 700° C. by the heater 5 (hereinafter referred to as a reaction area).

$$Fe(CO)_5 \rightarrow Fe + 5CO \quad \text{(equation 1)}$$

Fe particles are produced from the source gas 21 by the chemical reaction (equation 1). An average diameter of the Fe particles is about several nm.

The reaction inhibitor generating gas 22 including hydrogen and carbon dioxide is introduced. This reaction inhibitor generating gas 22 causes a chemical reaction (equation 2).

$$H_2 + CO_2 \rightarrow H_2O + CO \quad \text{(equation 2)}$$

This reaction produces CO. This is called a water gas shift reaction, and is known to proceed with iron as a catalyst.

By the way, the chemical reaction (equation 1) has a reverse reaction (equation 3).

$$Fe + 5CO \rightarrow Fe(CO)_5 \quad \text{(equation 3)}$$

Accordingly, if CO exists, the chemical reaction (equation 3) occurs at the same time. This reaction further proceeds as the CO concentration is higher. Namely, the progress of the chemical reaction (equation 1) is more inhibited, as the CO concentration is higher.

That is, at the same time of producing Fe from the source gas 21 by the reaction (equation 1), water and CO, which is a heat-decomposition-reaction inhibiting component, are produced from the reaction inhibitor generating gas 22 by the reaction (equation 2). If the reaction (equation 1) proceeds to produce Fe, the produced Fe serves as a catalyst to cause the reaction (equation 3) to proceed, and inhibits the proceeding of the reaction (equation 1).

In this manner, in the reaction container 1, the source gas 21, and the products such as Fe particles, CO and water are led into the exhaust portion 6 along with the flow of the carrier gas 4.

(5) The carrier gas 4 containing Fe particles exhausted from the reaction container 1, which is at the temperature of several hundreds degrees, is introduced into the cooler 7 and cooled to the room temperature.

(6) The carrier gas containing the cooled particles is introduced into the solvent reserved in the storage portion 8. Passing the solvent, Fe particles are mixed into the solvent, so that only the carrier gas is exhausted from the storage portion 8 into the atmosphere.

(7) The Fe particles are preserved in a mixing state with the solvent. Here, when the Fe particles are required, a desired amount of solvent is taken from the storage portion 8, is heated by a heater to evaporate the solvent components, and leave the Fe particles alone as the solute.

Figure 2:
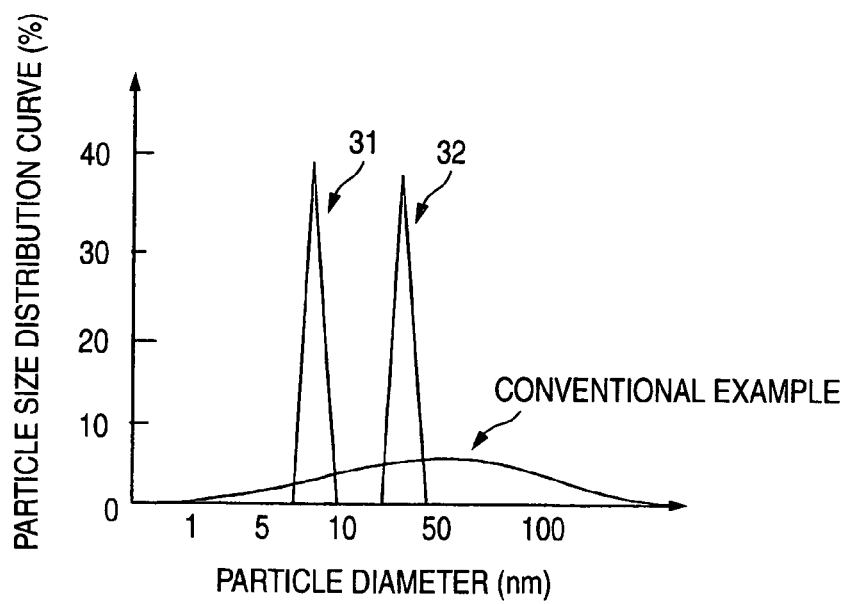
FIG. 2 is a graphical representation showing a particle size distribution of particles produced according to the embodiment of the invention.

FIG. 2 shows an example in which particles are produced in this embodiment. Here, the axis of abscissas represents the particle diameter of Fe particles and the axis of ordinates represents the number of particles collected.

A composite particle distribution 31 is obtained under the following condition:

the flow rate of $Fe(CO)_5$ (raw material) is 1 sccm;

the flow rate of hydrogen is 50 sccm;

the flow rate of carbon dioxide is 50 sccm; and the flow rate of nitrogen (carrier gas) is 100 sccm.

Also, a particle distribution 32 is obtained under the following condition:

the flow rate of $Fe(CO)_5$ (raw material) is 1 sccm;

the flow rate of hydrogen is 10 sccm;

the flow rate of carbon dioxide is 10 sccm; and the flow rate of nitrogen (carrier gas) is 100 sccm.

On the other hand, a conventional example is obtained under the following condition:

the flow rate of $Fe(CO)_5$ is 1 sccm;

the flow rate of hydrogen is 0 sccm;

the flow rate of carbon dioxide is 0 sccm; and the flow rate of nitrogen is 100 sccm.

The production was performed with changing a ration of the source gas 21 to the reaction inhibitor generating gas 22, which were introduced into the reaction container 1. As a result, the peak 31 and the peak 32 were obtained in the particle distribution as shown in FIG. 2. The peak 31 involves a smaller particle diameter, and the peak 32 involves a larger particle diameter. In both the examples, the particle diameter distribution with quite narrow width centered at a predetermined particle diameter is represented. That is, it is indicated that the Fe particles obtained are excellently uniform in the particle diameter.

Also, it is possible to control the particle diameter of the obtained particles by changing the ratio of the source gas 21 to the reaction inhibitor generating gas 22. That is, it is possible to make the particle diameter be smaller by increasing the concentration of the supplied reaction inhibitor generating gas, and be larger by decreasing it.

With the conventional method (conventional example), the particle diameter is distributed more widely.

As described above, in this embodiment, the reaction inhibitor generating gas is introduced together with the source gas. As a result, the particles of smaller diameter and narrow distribution width can be produced. Also, since few particles are discarded, the utilization efficiency of the source gas is enhanced.

Embodiment 2

In this embodiment, a Co particle is produced.

Herein, a particle producing apparatus similar to that of the first embodiment is employed.

The source gas is $Co_2(CO)_8$.

The reaction inhibitor generating gas includes hydrogen and carbon dioxide.

The carrier gas maybe an inert gas. Nitrogen is employed here.

The source gas is heated in a reaction furnace 1 to cause a reaction,

$$Co_2(CO)_8 \rightarrow 2Co + 8CO \quad \text{(equation 4)}$$

As a result, Co particles are produced. The average diameter of the Co particles is as large as about several nm.

The reaction (equation 4) has a reverse reaction, which is represented as

$$2Co + 8CO \rightarrow Co_2(CO)_8 \quad \text{(equation 5)}$$

This reaction further proceeds as the concentration of Co is higher. Namely, the progress (equation 4) is more inhibited as the concentration of CO is higher. As a result, the production of CO particles is suppressed.

Here, through the reaction (equation 2), Co is produced from the reaction inhibitor generating gas with Co as a catalyst. Accordingly, if Co is produced by the reaction (equation 4), the Co production reaction by the reaction (equation 2) proceeds so that the growth inhibition reaction by the reaction (equation 5) takes effect.

In this manner, the Co particles are produced with a narrow particle diameter distribution width. Also, the control of the particle diameter can be facilitated.

Embodiment 3

In this embodiment, Ni particles are produced.

Herein, a particle producing apparatus similar to that of the first embodiment is employed.

The source gas is $Ni(CO)_4$.

The reaction inhibitor generating gas includes hydrogen and carbon dioxide.

The carrier gas is nitrogen here.

The source gas is heated in the reaction furnace 1 to cause a reaction,

$$Ni(CO)_4 \rightarrow Ni + 4CO \quad \text{(equation 6)}$$

As a result, Ni particles are obtained. The average diameter of the Ni particles is as large as about several nm.

The reaction (equation 6) has a reverse reaction, which is represented as

$$Ni + 4CO \rightarrow Ni(CO)_4 \quad \text{(equation 7)}$$

This reaction further proceeds as the CO concentration is higher. Namely, the progress (equation 6) is more inhibited as the CO concentration is higher, so that the production of Ni particles is suppressed.

Herein, through the reaction (equation 2), CO is produced with Ni as the catalyst. Accordingly, if Ni is produced by the reaction (equation 6), the CO production reaction proceeds by the reaction (equation 2), so that the growth inhibition reaction by the reaction (equation 7) takes effect.

In this manner, the Ni particles are produced with a narrow particle diameter distribution width. Also, the control of the particle diameter can be facilitated.

As described above, according to the embodiments of the invention, the particle diameter of the particles is controlled to facilitate the production of the particles.

What is claimed is:

1. A particle producing method comprising:
   introducing a carrier gas into a reaction container;
   heating an inside of the reaction container; and
   introducing a source gas and a reaction inhibitor generating gas into the reaction container,
   wherein the source gas produces particles in the reaction container by a thermal decomposition reaction, and
   wherein the reaction inhibitor generating gas produces an inhibition component, which inhibits the thermal decomposition reaction with the particles used as a catalyst.

2. The particle producing method according to claim 1, wherein the reaction inhibitor generating gas includes hydrogen and carbon dioxide.

3. The particle producing method according to claim 1, wherein diameters of the particles are controlled in accordance with an amount of the reaction inhibitor generating gas introduced into the reaction container.

4. The particle producing method according to claim 1, wherein the source gas includes $Fe(CO)_5$.

5. The particle producing method according to claim 1, wherein the source gas includes $Co_2(CO)_8$.

6. The particle producing method according to claim 1, wherein the source gas includes $Ni(CO)_4$.

7. The particle producing method according to claim 1, wherein the carrier gas includes nitrogen.

8. The particle producing method according to claim 1, wherein the carrier gas is an inert gas.

9. The particle producing method according to claim 1, further comprising:
   determining ratio of the source gas to the reaction inhibitor generating gas in a flow rate to control an average diameter of the particles.

10. The particle producing method according to claim 1, wherein the reaction container is heated at a center part thereof in a carrier gas flowing direction.

11. A particle producing method comprising:
    pyrolyzing a source gas to produce particles; and
    producing an inhibition component, which inhibits the pyrolyzing, from a reaction inhibitor generating gas with the produced particles used as a catalyst, wherein the reaction inhibitor generating gas includes hydrogen and carbon dioxide.

12. The particle producing method according to claim 11, wherein the source gas includes $Fe(CO)_5$.

13. The particle producing method according to claim 11, wherein the source gas includes $Co_2(CO)_8$.

14. The particle producing method according to claim 11, wherein the source gas includes $Ni(CO)_4$.

15. The particle producing method according to claim 11, further comprising:
    determining ratio of the source gas to the reaction inhibitor generating gas in a flow rate to control an average diameter of the particles.

* * * * *